Aug. 26, 1958      M. W. BROSSMAN      2,849,272
RECYCLING DISPLACEMENT MEASURING AND RECORDING DEVICE
Filed June 22, 1953      2 Sheets-Sheet 1
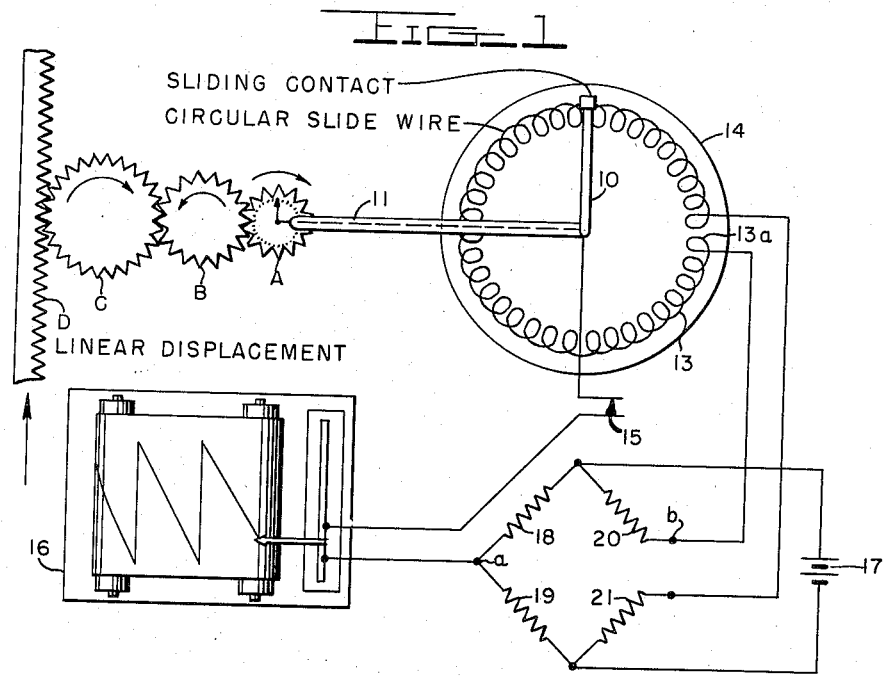
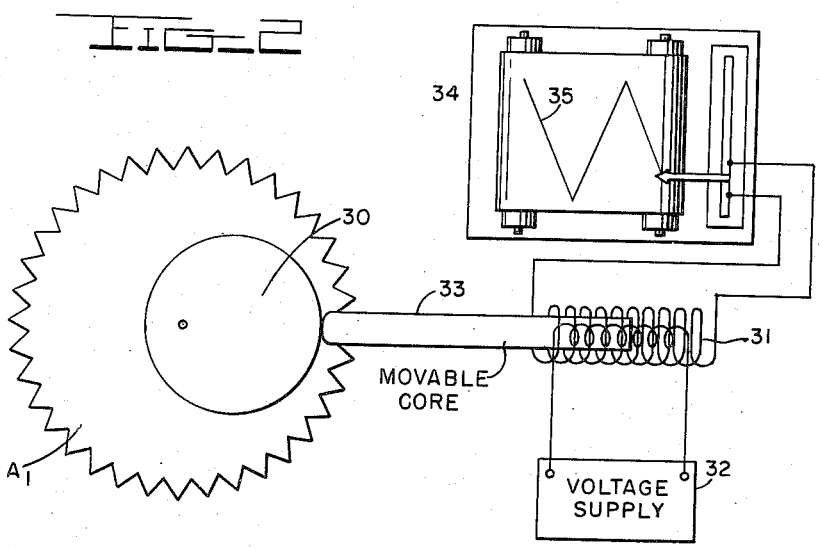
INVENTOR
MARTIN W. BROSSMAN
BY
*Howard White*
ATTORNEYS Aug. 26, 1958   M. W. BROSSMAN   2,849,272
RECYCLING DISPLACEMENT MEASURING AND RECORDING DEVICE
Filed June 22, 1953   2 Sheets-Sheet 2
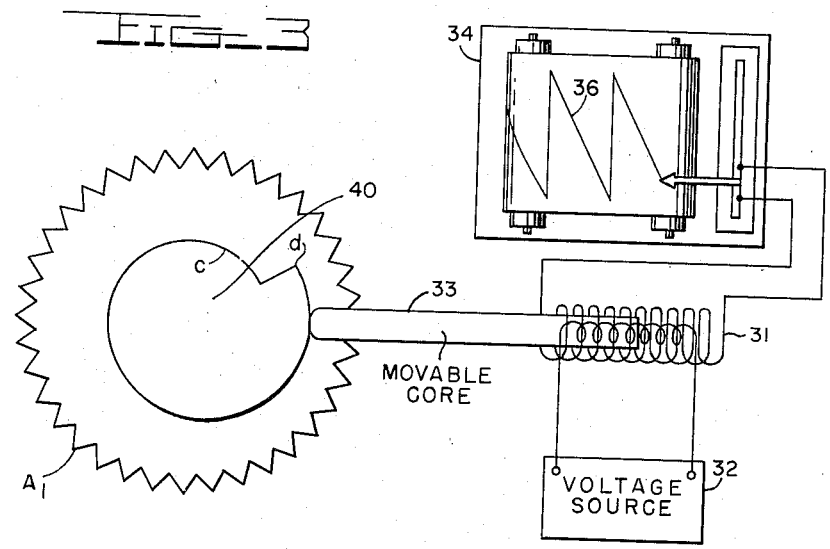
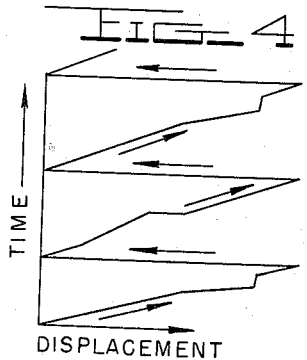
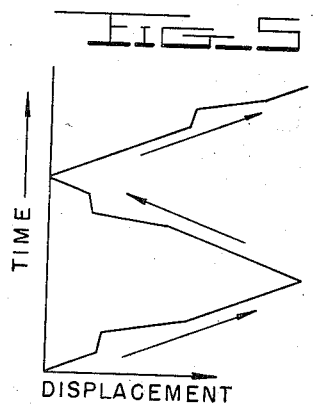
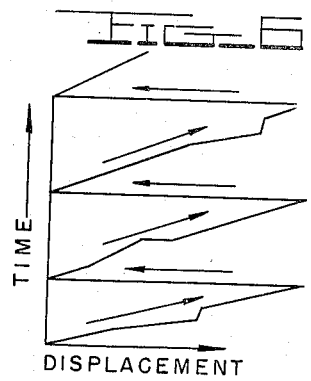
INVENTOR
MARTIN W. BROSSMAN
BY
ATTORNEYS

United States Patent Office 2,849,272
Patented Aug. 26, 1958

2,849,272

RECYCLING DISPLACEMENT MEASURING AND RECORDING DEVICE

Martin W. Brossman, Washington, D. C., assignor to the United States of America as represented by the Secretary of the Navy Application June 22, 1953, Serial No. 363,425

1 Claim. (Cl. 346—31)

(Granted under Title 35, U. S. Code (1952), sec. 266)

This invention relates in general to measuring and recording instruments and in particular to a method of and apparatus for extending the range of linear displacement measuring and recording instruments.

Among the apparatus for obtaining accurate measurements of linear displacements in the prior art are those involving pressure, voltage, optical and mechanical variations. Each of these seem to have substantial drawbacks to their use in anything outside their specific applications. Essentially, they may provide the user either with high sensitivity at limited range or low sensitivity at extended range. Ordinarily, the range is restricted by practical considerations limiting the length of path of movement of the free end of the pointer or other element which deflects to indicate and/or record variations in the value of the quantity measured. Here, any extension of the range of the scale i. e., widening the difference between the minimum and the maximum value of the quantity which the instrument can measure would serve to reduce the sensitivity of the instrument. A standard means to extend the range, in effect, without extending the range in the scale involves an electrical resistance switching arrangement in which the maximum range of the recording instrument will automatically become the minimum range when the maximum is reached and a new maximum will be established. This standard means for extending the range does not substantially reduce the sensitivity but both the special calibration necessary for each extension and the difficulty in determining which range is being used present serious disadvantages which tend to reduce its practical application in the measurement of extended displacements.

While present displacement measuring devices capable of supplying an output which is recordable may provide the user with either high sensitivity at limited range or low sensitivity at extended range, this invention uniquely combines the desirable characteristics of high sensitivity and extended range and thereby substantially eliminates other previous problems of resetting and multiple calibrations in the measuring of extended displacements. This invention, which will continuously measure any quantity which can be presented to it as a mechanical displacement, is of direct interest in many fields of research, engineering and production. As an example: thermal and flow measuring devices can be made displacement sensitive and fed directly into the apparatus of this invention. The invention is particularly useful in the measurement of unpredictable minute variations in large displacements.

It is an object of this invention to provide a new method of extending the range of a linear displacement measuring device without reducing the sensitivity of the device which does not require a new calibration for each extension of the range.

It is also an object of this invention to provide an extended range linear displacement measuring apparatus with a uniform high sensitivity over the entire range.

It is another object of this invention to provide an extended range linear displacement measuring device which may incorporate any conventional voltage sensitive recorder to produce a high sensitivity measuring instrument.

It is still another object of this invention to provide an extended range linear displacement measuring device which may incorporate any conventional current sensitive recorder to produce a high sensitivity measuring instrument.

It is a further object of this invention to provide an extended range linear displacement measuring and recording device which may incorporate a continuous translation of the linear displacement through an angular displacement to extend the range and increase the sensitivity of the measuring instrument.

Other objects of this invention will become apparent from a better understanding of the invention for which reference should be had to the accompanying drawings and description of the operation of this invention.

The features of this invention which are believed to be novel and patentable will be pointed out in the claim appended hereto.

In the drawings:

Figure 1 is a typical low torque rack and pinion linear displacement measuring unit as modified for one embodiment of this invention.

Figure 2 is the smaller pinion gear of a typical low torque rack and pinion linear measuring unit as modified for a second embodiment of this invention.

Figure 3 is the smaller pinion gear of a typical low torque rack and pinion linear measuring unit as modified for a third embodiment of this invention.

Figure 4 is the displacement v. time curve as recorded by a typical traveling chart recorder in the embodiment as shown in Figure 1.

Figure 5 is the displacement v. time curve as recorded by a typical traveling chart recorder in the embodiment as shown in Figure 2.

Figure 6 is the displacement v. time curve as recorded by a typical traveling chart recorder in the embodiment as shown in Figure 3.

Briefly, the invention utilizes a new and novel method of measuring and recording over a substantially unlimited range of displacement with a constant sensitivity throughout in which a linear displacement is continuously transformed into a cyclic angular displacement and information from each cycle of the angular displacement is recorded over the full scale of the recording device as an indication of the linear displacement variation.

In one embodiment the angular displacement information is obtained by varying the voltage ratio along a circular slidewire resistance element which constitutes the variable resistance in one leg of a standard resistance bridge network. This change in voltage ratio permits a galvanic measuring device to indicate a varying rate of current flow between the midpoints of the two opposite legs of the resistance network. The variation in current is used as the input to a traveling chart recording device which may clearly display an accurate record of the linear displacement.

In a second embodiment the angular displacement information is obtained by varying the inductive characteristics of a variable transformer. The inductive characteristics are varied by the positioning of an iron core within the transformer in accordance with the orientation of a cam which is mechanically coupled to vary in accordance with the angular displacement. The varying voltage output of the transformer is used as the input to a traveling chart recording device which may clearly display an accurate record of the linear displacement.

In a third embodiment there is a cam controlled variable transformer as in the second embodiment. However, in this embodiment, the cam is notched to permit the moveable core to rapidly return from a maximum to a minimum position within the transformer at the end of each cycle of angular displacement.

This invention as shown and described will provide a direct, continuous, and uninterrupted record of any quantity which can be presented to it as a mechanical displacement while using the full scale sensitivity of the recorder for incremental portions of the displacement.

Referring now to the drawings in detail, in this invention when employed with a low torque rack and pinion dial unit as shown in Figure 1, a linear displacement in the direction indicated in the drawing will cause the rack D to move accordingly and thus to rotate pinion gears C, B and A in their respective directions. In typical known rack and pinion units a pointer is mounted on the smallest gear A to give a direct reading of the linear displacement. In the first embodiment of this invention as shown in Figure 1 a sliding contact 10 is disposed to rotate in accordance with the movement of pinion gear A by means of a driving shaft 11 and to slidably contact a circular slidewire resistance element 13. The slidewire resistance 13 which is mounted on a stationary fixed disc 14 is electrically connected as the center resistance of one leg of a standard impedance bridge. The sliding contact 10 to the slidewire resistance 13 is electrically connected through a typical slip-ring arrangement 15 to one terminal of a traveling chart recording device 16. A second terminal of said recording device is electrically connected to the resistance junction $a$ of the opposite leg of said impedance bridge to permit the recording device to indicate any circuit unbalance due to a mechanical displacement. In the typical impedance bridge network including a voltage source 17, as shown, the ratio of resistance 18 to resistance 19 must be equivalent to the ratio of resistance 20 to the sum of resistance 21 and resistance element 13 to permit a circuit balance with a zero signal across the resistance junction points $a$ and $b$ of the impedance bridge. The chart recorder 16 which is connected across junction point $a$ and the sliding contact 10 will indicate any change in the resistance ratio produced by a change in displacement with respect to time or any other parameter. In order that zero displacement will be recorded as zero deflection, sliding contact 10 should be initially set at position 13$a$ on the resistance element 13. The sensitivity of the recorder is adjusted so that the amount of displacement necessary to produce one revolution of the sliding contact 10 will produce full scale deflection on the recorder 16. As the next revolution is begun, the contact moves to said zero deflection position 13$a$ on the resistance element 13 and automatically resets the recorder 16 to zero and the recording of the displacement continues. The chart record produced by the recorder 16 as shown in Figure 1 is that of a constant rate of displacement. In the operation of the device, a standard current sensitive recorder, such as the General Electric Photoelectric Recorder, may produce a record similar to that of Figure 4. The irregularities in the record of Figure 4 depict non-linear displacements as they might appear in a typical examination of a quantity. In a typical traveling chart recorder of the type shown, the rate of travel of the chart is maintained constant by means of a synchronous motor driving mechanism and the position of the pen, which moves transversely with respect to the direction of travel of the chart, is electrically controlled in accordance with the magnitude of the electrical signal input at any given instant.

It will be seen that the normal sensitivity of the recorder is multiplied by the number of times pinion gear A revolves during the displacement being measured. For obtaining optimum sensitivity it is important to establish a gear ratio in the rack and pinion that will provide a large number of rotations of small pinion A during the displacement of rack D. It will also be noted that larger displacements can be recorded with this invention simply by making rack D of sufficient length since the only other limitation is the length of the chart roll in recorder 16.

In a second embodiment of this invention as shown in Figure 2, gear $A_1$ with a cam 30 mounted thereon and rotated therewith is substituted for gear A in Figure 1. Although shown larger for the purpose of illustration gear $A_1$ would normally be the same size as gear A. Cam 30 operates to control a variable transformer 31 having one winding connected to a voltage source 32. Another winding of transformer 31 is connected to a traveling chart recorder 34. As shown in the drawing, transformer 31 has a movable core 33 which is disposed to follow the contour of the cam 30 as said cam is rotated about the axis of its associated gear $A_1$, and thus to vary the voltage from source 32 supplied to recorder 34 in accordance with the variation in the inductive characteristics of said transformer 31 produced by the change in the position of said core therein. Means such as a spring mechanism (not shown in the drawings) may be used to maintain the movable core 33 against the cam 30. Said cam 30 may be circular in shape with an offset center as shown, to provide a non-linear variation in the maximum to minimum positioning of the movable core 33 within the variable transformer 31 as said cam is rotated. It is foreseeable however, that a similar offset center cam may be designed to permit a variation in the maximum to minimum positioning of the movable core within the variable transformer 31 such that the energy from said transformer will vary from a minimum to a maximum at a constant rate throughout the complete cycle of revolution of the cam. In this embodiment the sensitivity of the recorder 34 is adjusted so that the amount of displacement necessary to produce one half a revolution of the cam 30 will produce full scale deflection on the recorder 34. When the cam 30 has revolved through the first half its cycle, i. e., the recorder has reached its maximum deflection, a further revolution through the second half of its cycle produces a decreasing recorder deflection to a minimum, whereupon the recorder deflection begins to increase again to display a continuous, uninterrupted reversing direction record as shown by lines 35 on the chart of recorder 34 in Figure 2 of the drawings. In the operation of the second embodiment of this invention a standard voltage sensitive recorder (such as a Brown or a Shaevitz recorder) may produce a record similar to that of Figure 5. Again the irregularities depict non-linear displacements as they might appear in a typical examination of a quantity.

In a third embodiment of this invention as shown in Figure 3, a notched cam 40 is substituted for the cam 30 shown in Figure 2. As in Figure 2, cam 40 operates to control a variable transformer 31 connected to a voltage source 32 and the transformer 31 has a movable core 33 which is disposed to follow the contour of the cam 40 as said cam is rotated about the axis of its associated gear $A_1$ and thus to vary the energy applied to recorder 34 in accordance with the variation in the inductive characteristics of said transformer produced by the change in the position of said core within the variable transformer. Again means such as a spring mechanism (not shown in the drawings) may be used to maintain the movable core against the cam 40. Said cam 40 may be notched and elliptical in shape with an offset center as shown to produce the desired maximum to minimum positioning of the movable core 33 within the variable transformer 31 as said cam 40 is rotated in a clockwise direction. The rotating cam 40 as shown will vary the input to the recorder progressing from a minimum when the core is at point $c$ up to a maximum when the core is at point $d$ on cam 40. Upon further rotation of the cam the core 33 immediately returns to its minimum position point $c$. The sensitivity of the recorder 34 is adjusted so that the amount of displacement necessary to produce one complete revolution of the cam 40 will produce full scale deflection on the recorder 34. The chart record 36 as shown in Figure 3 is that of a constant rate of displacement. In the operation of the third embodiment of this invention as described, a standard voltage sensitive recorder (such as a Brown or a Shaevitz recorder) may produce a record similar to that of Figure 6 in which the irregularities again depict non-linear displacements as they might appear in a typical examination of a quantity.

Dependent on the sensitivity desired in the recording device, it is feasible in both the second and third embodiments that the cam may be designed other than as shown to permit more than the presently permitted number of increases to a maximum and subsequent decreases to a minimum record tracings during any one cycle of rotation of the cam.

It is recognized that the first two embodiments have at least one distinct advantage over the third embodiment in that both of these embodiments permit a reversal in displacement direction at any point in the angular displacement cycle. In the third embodiment a reversal in linear displacement direction at that point in the angular displacement cycle when the cam follower 19 is at the point c of cam 16, would tend to bind the device and to resist the accurate movement of the indicator.

It is apparent to those skilled in the art that the invention may be carried out by other means within the purview of this disclosure and that the invention may operate with any low torque displacement translating unit. Further, it is readily understood that the invention is to be limited by the scope of the appended claim alone and that this invention is not to be limited by the drawings or description which are only illustrative of the device as it may be operated in several embodiments.

The invention described herein may be manufactured and used by or for the Government of the United States of America for governmental purposes without the payment of any royalties thereon or therefor.

What is claimed is:

An extended range displacement measuring and recording device comprising a rack and pinion in which the rack is moved in response to a linear displacement to be measured; a two leg impedance bridge; a circular potentiometer forming the centermost impedance of one leg of said impedance bridge; said potentiometer having a rotatable sliding contact mechanically coupled to said pinion to rotate therewith; said sliding contact being rotatable throughout complete revolutions in at least one selected direction; a recording means for recording time/rate of change, electrically connected between the center of the other leg of said impedance bridge and said sliding contact to indicate a difference in voltage therebetween proportional to the angular displacement of said pinion from a determined position, said recording means having a determined scaler interval for recording rate of change; said scaler interval being representative of "$n$" complete revolutions of said sliding contact, where "$n$" is an integer.

References Cited in the file of this patent
UNITED STATES PATENTS

| | | |
|---|---|---|
| 1,132,308 | Dempster | Mar. 16, 1915 |
| 1,269,525 | Craighead | June 11, 1918 |
| 1,300,525 | Warren | Apr. 15, 1919 |
| 1,347,676 | Bowdish | July 27, 1920 |
| 1,918,388 | Ferguson | July 18, 1933 |
| 2,451,757 | MacGeorge | Oct. 19, 1948 |
| 2,482,196 | Marye | Sept. 20, 1949 |
| 2,593,351 | Shannon | Apr. 15, 1952 |
| 2,637,619 | Stein | May 5, 1953 |
| 2,721,989 | Gates et al. | Oct. 25, 1955 |